Feb. 26, 1957 H. T. SPARROW 2,782,996
APPARATUS FOR ANTICIPATING THE EFFECT
OF CHANGES IN SOLAR RADIATION
Filed Nov. 22, 1955
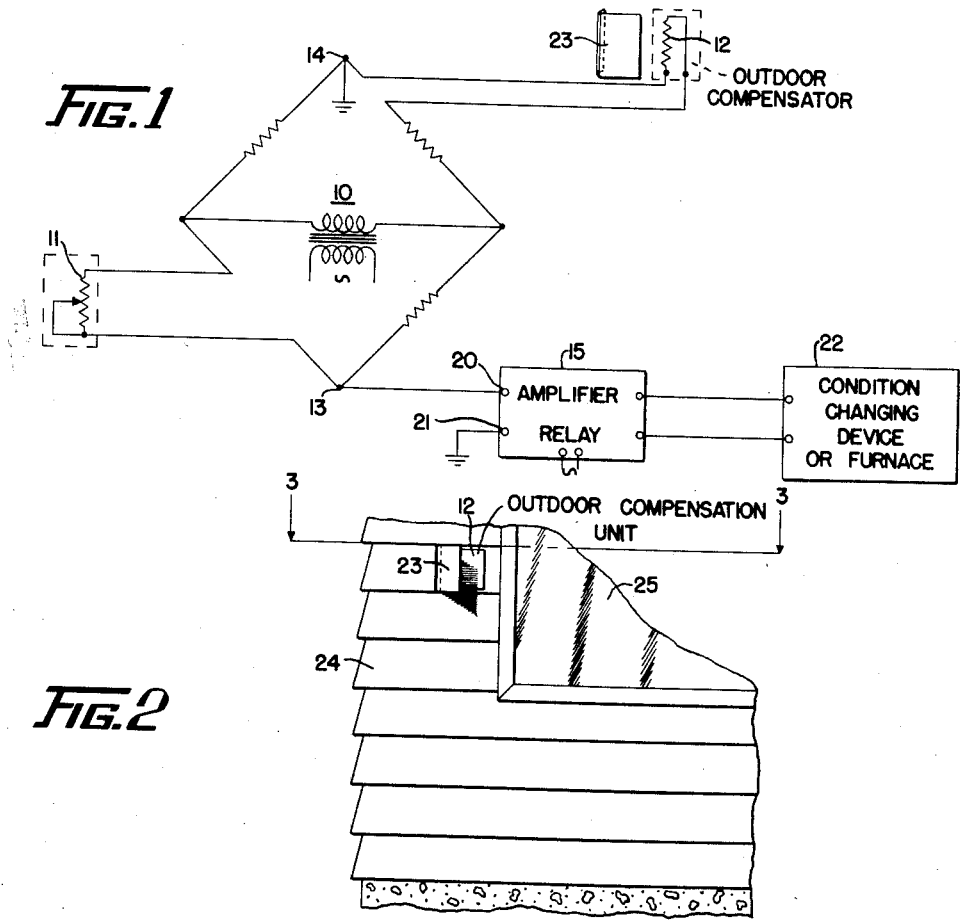
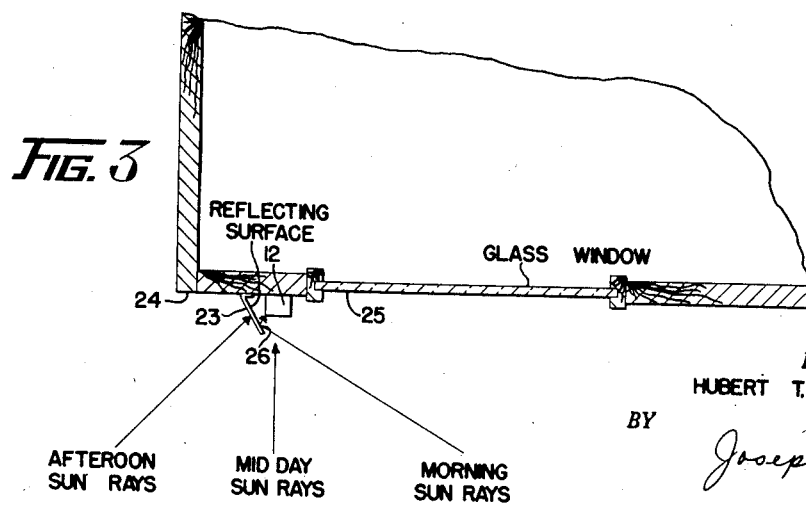
INVENTOR.
HUBERT T. SPARROW
BY
Joseph E. Ryan
ATTORNEY

United States Patent Office 2,782,996
Patented Feb. 26, 1957

2,782,996

APPARATUS FOR ANTICIPATING THE EFFECT OF CHANGES IN SOLAR RADIATION

Hubert T. Sparrow, Edina, Minn., assignor to Minneapolis-Honeywell Regulator Company, Minneapolis, Minn., a corporation of Delaware Application November 22, 1955, Serial No. 548,302

8 Claims. (Cl. 236—91)

The present invention is concerned with a solar radiation anticipation device for anticipating the effect of solar radiation on the heating load of a building, in particular, it comprises a reflecting and shading device for reflecting the early morning rays of the sun on an outdoor sensing element of a temperature control apparatus for controlling the temperature of the building, thus anticipating the reduction in heat load of the building as the sun moves into its midday position. The outdoor sensing device is shaded from the late afternoon sun rays to prevent a droop in the building temperature upon a loss of the solar radiation as evening sets in.

Normally, a building or residence has its inside temperature controlled by an indoor thermostat and this thermostat alone cannot anticipate possible changes in the outside weather conditions which might affect the heating load. A more refined heating control system has an outdoor temperature compensation unit which senses the outdoor temperature and so schedules the inside temperature to provide for maximum comfort. In buildings having large glassed areas on the southerly side of the building a large amount of heat is radiated into the building from the sun and this of course reduces the heating load of the dwelling. Should the outdoor temperature compensation unit be placed on the southerly side of the building to be exposed to the solar radiation it is not completely effective in providing for good control of the inside temperature as the inside thermostat has maintained a selected temperature therein throughout the morning. The addition of the solar heat during the midday often increases the temperature in the dwelling especially in the rooms having the southern exposure.

The present invention provides for a reflecting device mounted adjacent the outdoor temperature compensation unit and reflecting the early morning rays of the sun on the outdoor temperature compensation unit and reduce the inside temperature slightly. As the sun reaches its midday position and a considerable amount of heat is radiated into the building, the temperature therein will not become excessive due to this radiation. This is especially true in hot water floor or ceiling radiant panel systems having a considerable amount of lag as it requires time to heat up and cool a large mass of water, piping, concrete or plaster.

The reflecting device also acts as a shield to shield the late afternoon rays of the sun from the outdoor temperature compensation unit to anticipate the loss of the solar radiation and prevents a droop in the controlled temperature of the dwelling as evening sets in.

It is therefore an object of the present invention to provide an improved temperature control system in which the effect of solar radiation thereon can be anticipated.

It is a further object of the present invention to provide an improved temperature control system for a dwelling having a device outdoors for anticipating the reduction in heat load of the building upon the approachment of solar radiation.

It is still another object of the present invention to provide an improved temperature control apparatus for use in controlling a heat furnishing device in a building having an exposure receiving solar heat, the apparatus having a device for anticipating the effect of solar radiation by reflecting the early morning rays of the sun on a component of the apparatus.

Still another object of the present invention is to provide an improved temperature control apparatus for controlling the temperature control apparatus for controlling the temperature of a building whose heating load is affected by solar radiation, the apparatus having a device for sensing the amount of radiation, the device being shielded from the late afternoon rays of the sun to anticipate the loss of the solar radiation as it affects the heating load of the building as evening sets in.

These and other objects will become apparent upon a study of the following specification and drawings of which:

Figure 1 is a schematic circuit of a typical control apparatus for controlling the supply of heat to a building, the apparatus having an outdoor compensator which has a reflector-shield mounted adjacent thereof;

Figure 2 is a typical installation of the reflector-shield mounted adjacent an outdoor temperature compensation unit on the side of a house; and Figure 3 shows a plan view of a building to illustrate the effect of the reflector-shield at different periods during the day as it controls the effect of the solar radiation on the outdoor compensation unit.

Referring to Figure 1, there is shown a typical electric control system for controlling the operation of a condition changing device or furnace. It is of a type similar to that shown in the Wilson et al. Patent 2,572,293. A conventional bridge circuit 10 of a Wheatstone type has a temperature responsive resistance element or device 11 connected in one leg of the bridge. This resistance commonly referred to as the thermostat is in the building or residence to be responsive to the indoor temperature. A second temperature responsive resistance element or device 12 connected in an opposite leg is mounted outdoors to be responsive to the outdoor temperature. This resistance is commonly known as the outdoor compensator. The output of the bridge is obtained between terminals 13 and 14, terminal 14 being grounded. Terminal 13 is connected to one input terminal 20 of an amplifier relay 15 and a second input terminal 21 is grounded. The output of the relay amplifier is connected to control the operation of a condition changing device or furnace which furnishes a supply of temperature conditioned medium such as air to the building. By the proper selection of the resistances in the bridge circuit and the use of a conventional amplifier and relay the furnace can be controlled to maintain a desired temperature in the building wherein thermostat 11 is located. Resistance 12 is so selected that its effect upon the bridge circuit is to modify the control point of the bridge as its resistance value changes. With a high outdoor temperature such as 70° F. the thermostat 11 would control the furnace to maintain some selected temperature in the building. As the outdoor temperature decreased and the resistance of element 12 decreased the controlled temperature would rise, that is, for the same setting of the thermostat 11 a greater room temperature is necessary to balance the bridge and de-energize the furnace.

Mounted adjacent the outdoor compensator element 12 is a shield-reflector device 23. It comprises a rectangular sheet of metal having a polished surface 26 and a flange or fold on one edge or some suitable means for mounting the device on the side of the building. Device 23 is mounted with reflecting surface 26 adjacent element 12.

Referring to Figure 2, device 23 is shown mounted adjacent the outdoor compensation unit. The side of the building 24 on which it is mounted would be the southerly side which in a typical installation has a large portion of glass window area 25.

Device 23 is so mounted adjacent compensator unit 12 that the early morning rays of the sun coming from the easterly direction reflect off of shiny surface 26 onto compensating unit 12. As the sun approached its midday position the rays of the sun are still allowed to encroach upon device 12; however, as the sun moves in a westerly direction in the early afternoon its rays are blocked by device 23 to shade or shield device 12. It is of course obvious that the position of device 23 can be adjusted for the most favorable results and only one typical installation is shown in Figure 3. When a reflector-shield device of this sort is used with other types of control systems having outdoor sensors the position of the sensor determines the mounting position of the reflector-shield.

*Operation*

As solar radiation can greatly change the heating load of a building or dwelling, to obtain good control of the temperature in the building this solar radiation must be anticipated. This is especially true in the typical case shown in Figure 3 where the southerly exposure of the dwelling has a large glassed-in area as the heat from the sun often penetrates through the glass windows into the building to add to the heat supplied by the furnace thus increasing the room temperature. To rely on the room thermostat 11 or the outdoor compensator 12 to reduce the heat supplied to the building when the solar radiation is most effective, that is during midday, is inadequate as it is too late and an overshoot of the room temperature is experienced.

On days when the sun is shining the early morning rays of the sun strike reflector 23 and device 12 to increase its temperature. This changes the control point of thermostat 11 as it affects the temperature inside the building to slightly lower the maintained building temperature for the same outdoor temperature. As the sun moves farther into the south and the rays come more directly at the south side of the building the solar radiation is more effective to heat the building; however, any additional heat that it might supply only makes up for the reduction in the temperature by the setback of the control point previously mentioned and an overheating of the building is less likely to occur. During midday the sun shines directly on the outdoor compensation device 12 as well as the building and while the inside temperature is up to the level desired the control point of the system is reduced by the solar heat being supplied to device 12.

As the sun moves westwardly and its effect in supplying solar heat to the building is less effective the heating load of the building is increased. Due to an internal lag in the system, there is often experienced a droop in the building temperature between the time when the solar radiation ceases and the system is able to be restored to its normal controlled temperature level. In order to prevent this droop the device 23 acts as a shield to shade the device 12 from the late afternoon rays of the sun. The control point of the system is then re-established to a higher level and the increase in heating load as night sets in is anticipated.

While the reflector-shield device is shown separate from the outdoor compensating unit 12 it is obvious that the two might be combined into a single unit more readily adapted for marketing; however, while other modifications of the present invention are obvious to one skilled in the art, it is intended that the scope of the invention be limited only by the appended claims in which

I claim:

1. In a temperature control apparatus, a furnace for supplying heat to a dwelling, control means for controlling the furnace, said control means comprising a network circuit having first temperature responsive means responsive to the inside temperature of the dwelling, said responsive means being effective to energize the furnace to maintain the dwelling at a selected temperature, second temperature responsive means responsive to outdoor temperature, said second responsive means being effective to modify the effect of said first responsive means thereby increasing the dwelling temperature as the outdoor temperature decreases, reflector means associated with said outdoor temperature responsive means, said reflector means being positioned to reflect the morning sun rays directly on said outdoor temperature responsive means increasing its temperature thereby the effect of the solar heat from the sun as it affects the dwelling heating load can be anticipated, said reflector means also acting as a shield to shade the outdoor responsive means from the afternoon sun rays whereby the loss of solar heat as the sun becomes less effective can be anticipated to prevent a droop in the dwelling temperature.

2. In a temperature control apparatus for controlling the operation of a temperature changing device furnishing temperature conditioned medium to a space or dwelling, control means for controlling the operation of the temperature changing device, said control means having a first temperature responsive means responsive to the temperature in the space thereby conditioned medium is furnished to the space to maintain the temperature therein at a selected value, said control means having second temperature responsive means responsive to outside temperature, said second responsive means modifying the temperature maintained in the space by said first responsive means above or below said selected value depending on the outside temperature thus upon said second responsive means experiencing an increase in temperature the temperature in the space drops below said selected value, and reflector means associated with said second responsive means for concentrating the rays of the sun upon said responsive means at a certain time of the day to anticipate the effect of the lessening of the heat load of the space as the heat from the sun enters the space, said reflector means shading said second responsive means from the rays of the sun at another time of the day to anticipate the loss of the heat furnished to the space by the sun.

3. In a temperature control apparatus for controllng the operation of a heat furnishing device furnishing heat to a dwelling in particular one whose temperature is greatly affected by solar radiation, control apparatus for controlling the operation of said heat furnishing device, said control apparatus having a selected control point for maintaining a predetermined temperature in said dwelling, radiation responsive means associated with said control apparatus, said responsive means being responsive to the solar radiation and being adapted to readjust said control point depending upon the amount of solar radiation, means associated with said responsive means for concentrating solar radiation thereon during selected periods of the day before which the solar radiation has much effect upon the temperature of the dwelling and reducing the control point of said control apparatus thereby anticipating the effect of said radiation on the dwelling temperature.

4. In temperature control apparatus for controlling the operation of a temperature changing device furnishing a quantity of conditioned medium to a space for changing the temperature thereof; control means for controlling the operation of said device, said control means having first temperature responsive means responsive to a temperature indicative of a need of operation of said device thereby the temperature in the space is held at a selected level, and second temperature responsive means responsive to solar radiation and being effective to modify the temperature maintained in the space above or below said selected value, reflection means associated with said second responsive means for reflecting the rays of the sun thereon thereby resulting in the lowering of the space temperature below said selected level.

5. In temperature control apparatus for controlling the operation of a temperature changing device furnishing a conditioned medium to a space for changing the temperature thereof, control means for controlling the operation of the temperature changing device, said control means maintaining a temperature in the space depending upon the control point of said control means, second temperature responsive means responsive to outdoor temperature adapted to adjust the control point of said control means, said second responsive means being located on the southerly exposure of an outside wall of the space so that its temperature will also be affected by solar radiation and thereby lower said control point whenever the sun is shining, reflector means mounted in close proximity to said second responsive means for directing the early morning rays of the sun on said responsive means thereby anticipating the effect of the heat from the sun on the space, said reflector being so positioned as to shield said responsive means from the later day rays of the sun and thus raise said control point to anticipate the need of heat to offset the loss of the solar radiation in the early evening.

6. In a temperature control system for controlling the temperature of a building to which heat is supplied from a furnace, control means for controlling the operation of the furnace, said control means comprising temperature responsive means responsive to the outdoor temperature for controlling the output of the furnace to maintain selected temperatures in the building for various outdoor temperatures, the temperature of the building being reduced upon the presence of solar radiation as the rays of the sun increase the temperature of said responsive means above the normal outdoor temperature, reflector means for concentrating the early morning rays of the sun on said responsive means to anticipate the expected solar radiation around midday, and shield means for shielding said responsive means from the solar radiation in the late afternoon so that the temperature in the building will again be restored for the particular outdoor temperature to prevent the possible droop in building temperature upon a loss of the solar radiation.

7. In a temperature control system for controlling the temperature of a building to which heat is supplied from a furnace, control means for controlling the operation of the furnace, said control means comprising temperature responsive means responsive to the outdoor temperature for controlling the output of the furnace to maintain selected temperatures in the building for various outdoor temperatures, the temperature of the building being reduced upon the presence of solar radiation as the rays of the sun increase the temperature of said responsive means above the normal outdoor temperature, and reflector means for concentrating the early morning rays of the sun on said responsive means to anticipate the expected solar radiation around midday.

8. In a temperature control system for controlling the temperature of a building to which heat is supplied from a furnace, control means for controlling the operation of the furnace, said control means comprising temperature responsive means responsive to the outdoor temperature for controlling the output of the furnace to maintain selected temperatures in the building for various outdoor temperatures, the temperature of the building being reduced upon the presence of solar radiation as the rays of the sun increase the temperature of said responsive means above the normal outdoor temperature, and shield means for shielding said responsive means from the solar radiation in the late afternoon so that the temperature in the building will again be restored for the particular outdoor temperature to prevent the possible droop in building temperature upon a loss of the solar radiation.

References Cited in the file of this patent

UNITED STATES PATENTS

| | | |
|---|---|---|
| 2,083,317 | Dallenbach | June 8, 1937 |
| 2,136,559 | Miller | Nov. 15, 1938 |
| 2,236,624 | Littwin | Apr. 1, 1941 |
| 2,524,796 | Higgins | Oct. 10, 1950 |

OTHER REFERENCES

Shoemaker, "Radiant Heating," by R. W. Shoemaker, pp. 132–137, First Edition, published, 1948, by McGraw-Hill Book Company, New York City.